(12) United States Patent
Hiroki et al.

(10) Patent No.: US 9,057,173 B2
(45) Date of Patent: Jun. 16, 2015

(54) HYBRID CONSTRUCTION MACHINE (75) Inventors: Takenori Hiroki, Ibaraki-ken (JP);
Manabu Edamura, Kasumigaura (JP);
Manabu Sugiura, Tsuchiura (JP); Kouji Ishikawa, Kasumigaura (JP); Hidetoshi Satake, Ishioka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 249 days.

(21) Appl. No.: 13/698,414

(22) PCT Filed: Oct. 3, 2011

(86) PCT No.: PCT/JP2011/072735
§ 371 (c)(1),
(2), (4) Date: Nov. 16, 2012

(87) PCT Pub. No.: WO2012/046677
PCT Pub. Date: Apr. 12, 2012

(65) Prior Publication Data
US 2013/0243557 A1 Sep. 19, 2013

(30) Foreign Application Priority Data
Oct. 8, 2010 (JP) .................................. 2010-228961

(51) Int. Cl.
*E02F 9/20* (2006.01)
*B60L 11/12* (2006.01)
(Continued)

(52) U.S. Cl.
CPC ................. *E02F 9/20* (2013.01); *B60L 11/123* (2013.01); *E02F 9/128* (2013.01); *E02F 9/2075* (2013.01);
(Continued)

(58) Field of Classification Search
CPC .......... E02F 9/20; E02F 9/2075; E02F 9/2095; E02F 9/128
See application file for complete search history.

(56) References Cited

U.S. PATENT DOCUMENTS 6,666,022 B1 12/2003 Yoshimatsu et al.
7,067,999 B2 * 6/2006 Sugano et al. ................ 318/372
(Continued)

FOREIGN PATENT DOCUMENTS

JP 62-200803 U 12/1987
JP 2001-016704 A 1/2001
(Continued)

OTHER PUBLICATIONS

International Preliminary Report on Patentability received in International Application No. PCT/JP2011/072735 dated May 16, 2013.

*Primary Examiner* — Thomas E Lazo
(74) *Attorney, Agent, or Firm* — Mattingly & Malur, PC (57) ABSTRACT

Provided is a hybrid construction machine capable of letting the operator immediately stop the swing structure by performing a stopping operation for ordinary construction machines even when the swing structure moves differently from the operator's will for some reason. The hybrid construction machine comprises: an inverter controller which outputs a PWM signal to an inverter and thereby controls the revolution speed of an electric motor; a first electric circuit including blocking means which blocks the PWM signal outputted from the inverter controller to the inverter in response to either an immobilization selection inputted through a gate lock lever switch or an OFF selection inputted through an ignition switch; and a second electric circuit including a swing brake solenoid valve which activates a swing brake in response to either the immobilization selection inputted through the gate lock lever switch or the OFF selection inputted through the ignition switch.

4 Claims, 5 Drawing Sheets

(51) Int. Cl.
*E02F 9/12* (2006.01)
*B60L 1/00* (2006.01)
*B60L 3/00* (2006.01)
*B60L 11/00* (2006.01)
*B60L 15/20* (2006.01)

(52) U.S. Cl.
CPC ........... *Y02T 10/7077* (2013.01); *E02F 9/2095* (2013.01); *B60L 1/003* (2013.01); *B60L 3/0084* (2013.01); *B60L 11/005* (2013.01); *B60L 15/20* (2013.01); *B60L 2200/40* (2013.01); *B60L 2210/40* (2013.01); *B60L 2240/421* (2013.01); *B60L 2240/423* (2013.01); *Y02T 10/7241* (2013.01); *Y02T 10/7022* (2013.01); *Y02T 10/6217* (2013.01); *Y02T 10/642* (2013.01); *Y02T 10/7275* (2013.01)

(56) References Cited

U.S. PATENT DOCUMENTS

| 7,345,441 | B2 * | 3/2008 | Yoshimatsu | 318/372 |
| 8,286,741 | B2 * | 10/2012 | Kawashima | 180/65.285 |
| 8,543,296 | B2 * | 9/2013 | Sano | 701/42 |

FOREIGN PATENT DOCUMENTS

| JP | 2004-124381 A | 4/2004 |
| JP | 2010-001655 A | 1/2010 |

\* cited by examiner

HYBRID CONSTRUCTION MACHINE

TECHNICAL FIELD

The present invention relates to a hybrid construction machine, and in particular, to a hybrid construction machine employing an electric motor for driving the swing structure.

BACKGROUND ART

Construction machines such as hydraulic shovels drive a hydraulic pump using the engine, as its power source, that uses fuel (gasoline, light oil, etc.) and generate hydraulic pressure, thereby driving hydraulic actuators (hydraulic motor, hydraulic cylinder, etc.). Being small-sized, lightweight and capable of outputting high power, the hydraulic actuators are widely used as actuators for the construction machines.

Meanwhile, recently proposed are construction machines that employ an electric motor and an electricity storage device (battery, electric double layer capacitor, etc.) and thereby realize higher energy efficiency and more energy saving compared to the conventional construction machines employing hydraulic actuators only (Patent Literature 1).

Electric motors (electric actuators) have some excellent features in terms of energy, such as higher energy efficiency compared to hydraulic actuators and the ability to regenerate electric energy from kinetic energy at the time of braking. The kinetic energy is released and lost as heat in the case of hydraulic actuators.

For example, the Patent Literature 1 discloses an embodiment for a hydraulic shovel having an electric motor as the actuator for driving the swing structure.

Further, to make the best use of superior characteristics of the conventional hydraulic motors (reliability, feeling, etc.) while also realizing the energy saving, there have also been proposed construction machines that are equipped with both a hydraulic motor and an electric motor and drive the swing structure with total torque of the hydraulic motor and the electric motor (Patent Literature 2). The Patent Literature 2 discloses an energy regeneration device for a hydraulic construction machine in which the electric motor is connected directly to the swinging hydraulic motor (hydraulic motor for driving the swing structure). A controller in the energy regeneration device determines the output torque of the electric motor in response to the operation amount of the control lever and sends an output torque command to the electric motor.

Incidentally, such construction machines having a swing structure (e.g., hydraulic shovels) are equipped with a brake for holding the swing structure at a fixed position when the vehicle (construction machine) is stopped. The brake is released when the swinging hydraulic motor drives the swing structure according to a signal inputted from the swing control lever. The brake is activated and works when the lever is returned to the neutral position and the hydraulic motor is stopped. Since the revolution speed (number of revolutions) of the hydraulic motor is not detected in ordinary hydraulic shovels, a hydraulic timer circuit (using a throttle, etc.) is employed in many cases so that the brake operates a while after the lever is returned to the neutral position, as disclosed in Patent Literature 3, for example.

PRIOR ART LITERATURE

Patent Literature

Patent Literature 1: JP,A 2001-16704
Patent Literature 2: JP,A 2004-124381
Patent Literature 3: JP,U 62-200803

SUMMARY OF THE INVENTION

Problem to be Solved by the Invention

When machinery such as the swing structure moves differently from the operator's will for some reason in a hydraulic shovel comprising the swinging hydraulic motor, the operator is generally supposed to stop the power source by turning off the engine key or to block the supply of the hydraulic fluid from the hydraulic pressure source by operating the gate lock lever. Consequently, the machinery can be stopped immediately in a construction machine employing the conventional technique of the Patent Literature 3, for example.

In contrast, construction machines have a swing structure driving device employing an electric motor as shown in the Patent Literatures 1 and 2. In such construction machines, a PWM signal is generated according to motor control algorithm software installed in an inverter controller. By opening and closing switching elements of an inverter with the PWM signal, a three-phase alternating current is generated to drive and control the electric motor. Since the electric motor depends on the software of the controller (microcomputer, etc.) for its driving, as explained above, there are cases where the operator cannot immediately stop the failed machinery (e.g., the swing structure moving differently from the operator's will for some reason) even by performing the aforementioned operations.

Further, safety measures involving software are not approved as safety devices by the mechanical/electrical safety standard 1EC60204.

The object of the present invention, which has been made in consideration of the above circumstances, is to provide a hybrid construction machine employing an electric motor for the driving of the swing structure and also being capable of letting the operator immediately stop the swing structure by performing a stopping operation for ordinary construction machines even when the swing structure moves differently from the operator's will for some reason.

Means for Solving the Problem

To achieve the above object, the invention is, in a first aspect, a hybrid construction machine having a prime mover, an ignition switch for starting and stopping the prime mover, a hydraulic pump which is driven by the prime mover, a swing structure, an electric motor for driving the swing structure, an electricity storage device which is connected to the electric motor, an inverter for driving the electric motor, hydraulic actuators which are driven by the hydraulic pump, a swing brake which is driven by hydraulic pressure and stops the rotation of the swing structure, a gate lock lever switch which is used for selecting whether to mobilize or immobilize the hydraulic actuators, and a swing control lever device which is used for commanding the driving of the swing structure, wherein the hybrid construction machine comprises: an inverter controller which outputs a PWM signal to the inverter and thereby controls the revolution speed of the electric motor; a first electric circuit including blocking means which blocks the PWM signal outputted from the inverter controller to the inverter in response to either an immobilization selection inputted through the gate lock lever switch or an OFF selection inputted through the ignition switch; and a second electric circuit including a swing brake solenoid valve which activates the swing brake in response to either the immobilization selection inputted through the gate lock lever switch or the OFF selection inputted through the ignition switch.

A second aspect of the invention is the hybrid construction machine of the first aspect further comprising: a hydraulic motor for driving the swing structure; and a control device which drives the swing structure with total torque of the electric motor and the hydraulic motor by driving both the electric motor and the hydraulic motor when the swing control lever device is operated.

A third aspect of the invention is the hybrid construction machine of the first or the second aspect, wherein the swing brake driven by hydraulic pressure includes: normal stop means which starts braking operation a certain time period after detecting a neutral position of the swing control lever device; and emergency stop means which starts braking operation in a shorter time period, compared to the certain time period after the detection by the normal stop means, in response to a signal from emergency stop detecting means.

Effect of the Invention

According to the present invention, when machinery such as the swing structure moves differently from the operator's will for some reason in a hybrid construction machine employing an electric motor for the driving of the swing structure, the operator's stopping operation for ordinary construction machines (returning the ignition switch of the engine to OFF, switching the gate lock lever to the lock position, etc.) securely turns the swinging electric motor to the free running state and activates the brake (for stopping the failed machinery) with appropriate timing, by which the swing structure can be stopped immediately. Consequently, the safety of hybrid construction machines and operators can be improved and the operating ratio of hybrid construction machines can be increased.

MODE FOR CARRYING OUT THE INVENTION

Figure 1:
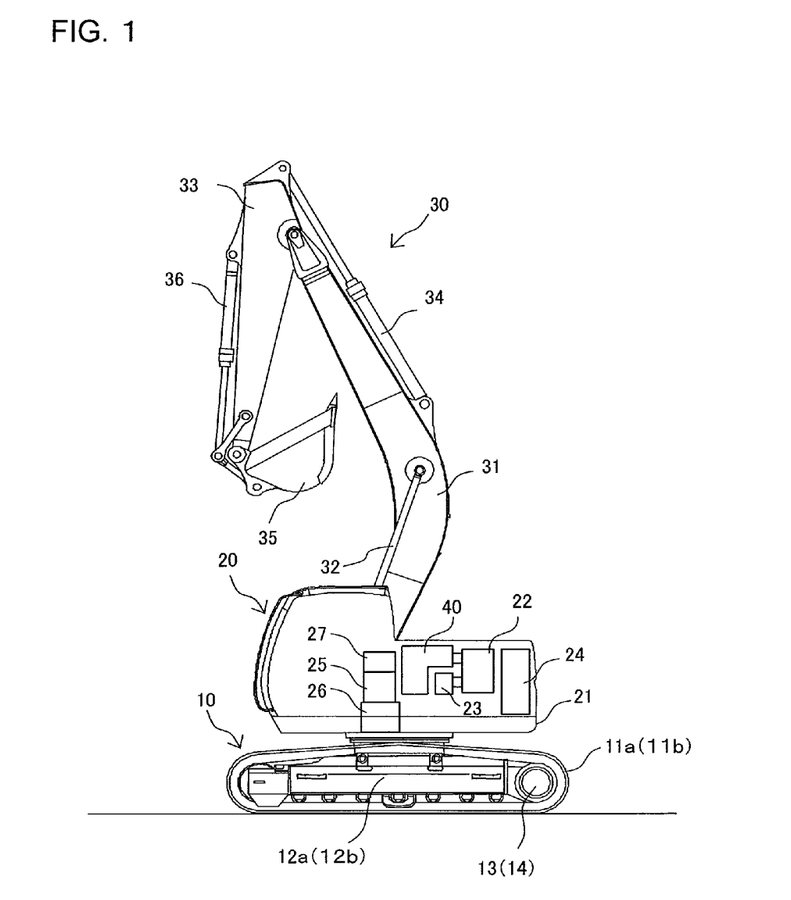
FIG. 1 is a side view showing a first embodiment of a hybrid construction machine in accordance with the present invention.
Figure 2:
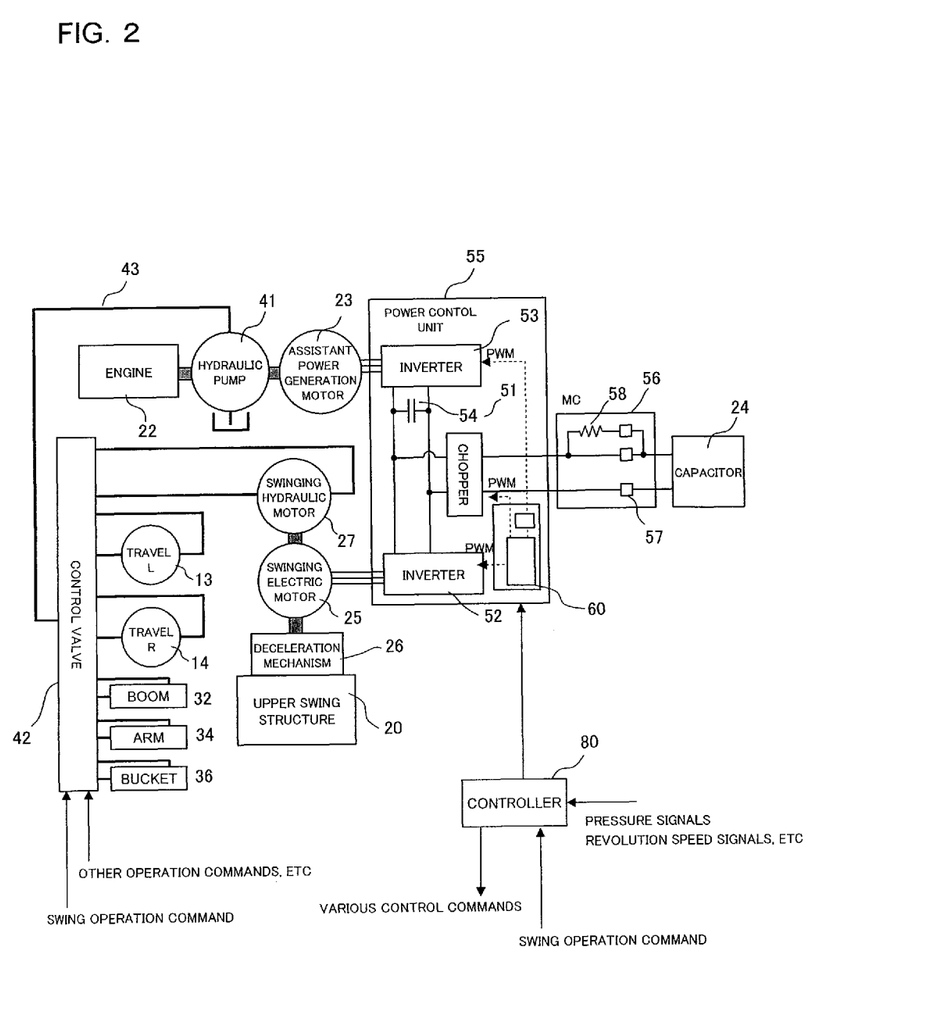
FIG. 2 is a schematic block diagram showing the system configuration of electric/hydraulic devices constituting the first embodiment of the hybrid construction machine in accordance with the present invention.
Figure 3:
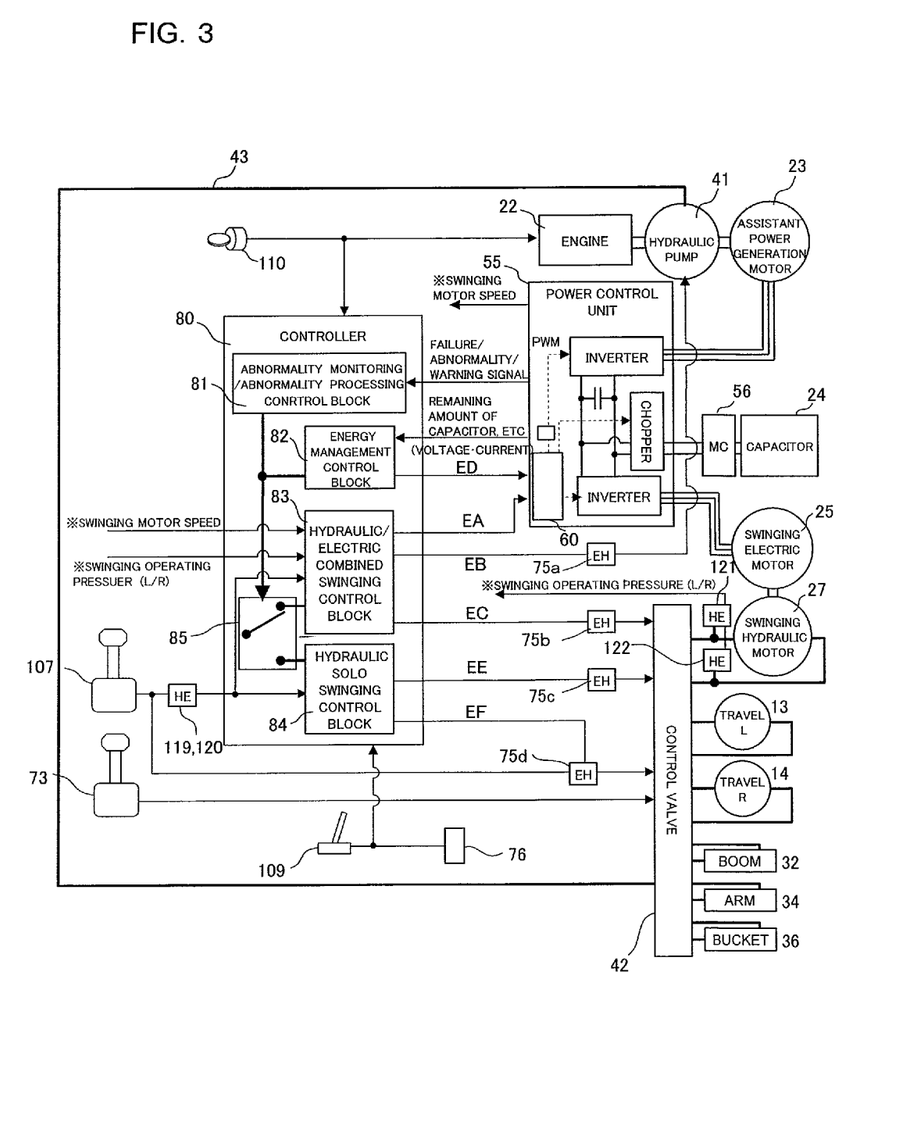
FIG. 3 is a schematic block diagram showing the system configuration and control blocks of the first embodiment of the hybrid construction machine in accordance with the present invention.

In the following, embodiments of the present invention will be described by taking an example of a hybrid hydraulic shovel employing an electric motor as a device for driving the swing structure. The present invention is applicable generally to various construction machines (e.g., operating machines) having a swing structure, and thus the application of the present invention is not restricted to hydraulic shovels. For example, the present invention is applicable also to other construction machines such as crane vehicles having a swing structure. FIG. 1 is a side view showing a first embodiment of a hybrid construction machine in accordance with the present invention. FIG. 2 is a schematic block diagram showing the system configuration of electric/hydraulic devices constituting the first embodiment of the hybrid construction machine in accordance with the present invention. FIG. 3 is a schematic block diagram showing the system configuration and control blocks of the first embodiment of the hybrid construction machine in accordance with the present invention.

In FIG. 1, the hybrid hydraulic shovel comprises a track structure 10, a swing structure 20 mounted on the track structure 10 to be capable of swinging (rotating), and a shovel mechanism 30.

The track structure 10 includes a pair of crawlers 11a and 11b (only one side is shown in FIG. 1), a pair of crawler frames 12a and 12b (only one side is shown in FIG. 1), a pair of traveling hydraulic motors 13 and 14 for independently driving and controlling the crawlers 11a and 11b, respectively, deceleration mechanisms for the traveling hydraulic motors 13 and 14, etc.

The swing structure 20 includes a swing frame 21, an engine 22 (as a prime mover) mounted on the swing frame 21, an assistant power generation motor 23 driven by the engine 22, a swinging electric motor 25, a swinging hydraulic motor 27, an electric double layer capacitor 24 connected to the assistant power generation motor 23 and the swinging electric motor 25, a deceleration mechanism 26 for decelerating the rotations of the swinging electric motor 25 and the swinging hydraulic motor 27, etc. The driving force of the swinging electric motor 25 and the swinging hydraulic motor 27 is transmitted via the deceleration mechanism 26, by which the swing structure 20 (swing frame 21) is driven and rotated with respect to the track structure 10.

The swing structure 20 is equipped with the shovel mechanism (front implement) 30. The shovel mechanism 30 includes a boom 31, a boom cylinder 32 for driving the boom 31, an arm 33 supported by a distal end part of the boom 31 to be rotatable around an axis, an arm cylinder 34 for driving the arm 33, a bucket 35 supported by the distal end of the arm 33 to be rotatable around an axis, a bucket cylinder 36 for driving the bucket 35, etc.

Further, a hydraulic system 40 for driving hydraulic actuators (such as the aforementioned traveling hydraulic motors 13 and 14, swing hydraulic motor 27, boom cylinder 32, arm cylinder 34 and bucket cylinder 36) is mounted on the swing frame 21 of the swing structure 20. The hydraulic system 40 includes a hydraulic pump 41 (see FIG. 2) as a hydraulic pressure source for generating the hydraulic pressure and a control valve 42 (see FIG. 2) for driving and controlling the actuators. The hydraulic pump 41 is driven by the engine 22.

Next, the outline of the system configuration of the electric/hydraulic devices of the hydraulic shovel will be explained. As shown in FIG. 2, the driving force of the engine 22 is transmitted to the hydraulic pump 41. The control valve 42 controls the flow rate and the direction of the hydraulic fluid supplied to the swinging hydraulic motor 27 according to a swing operation command (hydraulic pilot signal) inputted from a swing control lever device 107 for the swinging (see FIG. 3). The control valve 42 also controls the flow rate and the direction of the hydraulic fluid supplied to each of the boom cylinder 32, the arm cylinder 34, the bucket cylinder 36 and the traveling hydraulic motors 13 and 14 according to an operation command (hydraulic pilot signal) inputted from an unshown control lever device for operations other than the swinging.

An electric system of the hybrid hydraulic shovel is made up of the assistant power generation motor 23, the capacitor 24, the swinging electric motor 25, a power control unit 55, a main contactor 56, etc. The power control unit 55 includes a chopper 51, inverters 52 and 53, a smoothing capacitor 54, etc. The main contactor 56 includes a main relay 57, an inrush current prevention circuit 58, an inverter controller 60 (see FIG. 3), etc.

The voltage of DC power supplied from the capacitor 24 is boosted by the chopper 51 to a prescribed bus line voltage and is inputted to the inverter 52 (for driving the swinging electric motor 25) and the inverter 53 (for driving the assistant power generation motor 23). The smoothing capacitor 54 is used for stabilizing the bus line voltage. The swinging electric motor 25 and the swinging hydraulic motor 27, whose rotating shafts are connected to each other, cooperatively drive the swing structure 20 via the deceleration mechanism 26. The capacitor 24 is charged or discharged depending on the driving status (regenerating or power running) of the assistant power generation motor 23 and the swinging electric motor 25.

A controller 80 generates control commands for the control valve 42 and the power control unit 55 by using the swing operation command signal, pressure signals, a revolution speed signal, etc. (explained later) and executes a variety of control, such as switching between a hydraulic solo swing mode (using the swinging hydraulic motor 27) and a hydraulic/electric combined swing mode (using both the swinging hydraulic motor 27 and the swinging electric motor 25), swinging control in each mode, abnormality monitoring of the electric system and energy management.

Next, devices, control means, control signals, etc. necessary for carrying out the swinging control in accordance with the present invention will be explained in more detail referring to FIG. 3.

The hydraulic shovel is equipped with an ignition switch 110 for starting up the engine 22 and a gate lock lever device 109 for turning a pilot pressure shutoff valve 76 on and thereby disabling the operation of the hydraulic system when the operator stops the operation (work). The hydraulic shovel is further equipped with the aforementioned controller 80 and devices (hydraulic-electric conversion units 119, 120, 121 and 122 and electric-hydraulic conversion unit 75a, 75b, 75c and 75d) related to the input/output of the controller 80. These components constitute a swinging control system. The hydraulic-electric conversion units 119, 120, 121 and 122 are implemented by pressure sensors, for example. The electric-hydraulic conversion units 75a, 75b, 75c and 75d are implemented by solenoid-operated proportional pressure-reducing valves, for example.

The controller 80 includes an abnormality monitoring/abnormality processing control block 81, an energy management control block 82, a hydraulic/electric combined swinging control block 83, a hydraulic solo swinging control block 84, a control switching block 85, etc.

In a state in which the whole system has no abnormality and the driving of the swinging electric motor 25 is possible, the controller 80 selects the hydraulic/electric combined swing mode. In this case, the control switching block 85 has connected with the hydraulic/electric combined swinging control block 83, and thus the operation of the swinging actuator is controlled by the hydraulic/electric combined swinging control block 83. The hydraulic pilot signal generated according to the operator's input to the swing control lever device 107 is converted by the hydraulic-electric conversion units 119 and 120 into an electric signal and inputted to the hydraulic/electric combined swinging control block 83. Operating pressures of the swinging hydraulic motor 27 are converted by the hydraulic-electric conversion units 121 and 122 into electric signals and inputted to the hydraulic/electric combined swinging control block 83. A swinging motor speed signal which is outputted by an inverter (for driving the electric motor) inside the power control unit 55 is also inputted to the hydraulic/electric combined swinging control block 83. The hydraulic/electric combined swinging control block 83 calculates command torque for the swinging electric motor 25 by performing prescribed calculations based on the hydraulic pilot signal from the swing control lever device 107, the operating pressure signals of the swinging hydraulic motor 27 and the swinging motor speed signal, and outputs a torque command EA to the inverter controller 60 in the power control unit 55. Consequently, the swinging electric motor 25 operates for the driving of the swing structure 20. At the same time, the hydraulic/electric combined swinging control block 83 outputs reduced torque commands EB and EC, for reducing the output torque of the hydraulic pump 41 and the output torque of the swinging hydraulic motor 27 by the torque outputted by the swinging electric motor 25, to the electric-hydraulic conversion units 75a and 75b.

Meanwhile, the hydraulic pilot signal generated according to the operator's input to the swing control lever device 107 is inputted also to the control valve 42. By the input, a spool 113 (see FIG. 4) for the swinging motor is switched from its neutral position to a position A or C, the hydraulic fluid discharged from the hydraulic pump 41 is supplied to the swinging hydraulic motor 27, and consequently, the swinging hydraulic motor 27 is also driven at the same time.

The amount of electricity stored in the capacitor 24 (electric amount) increases/decreases depending on the difference between the energy consumed by the swinging electric motor 25 in acceleration and the energy regenerated by the swinging electric motor 25 in deceleration. This is controlled by the energy management control block 82. The energy management control block 82 performs the control so as to keep the electric amount of the capacitor 24 within a prescribed range by outputting a power generation/assistance command ED to the assistant power generation motor 23.

The inverter controller 60 in the power control unit 55 receives the torque command EA and the power generation/ assistance command ED from the controller 80, outputs PWM signals to the inverters 52 and 53 according to the commands, and thereby opens and closes unshown switching elements in the inverters 52 and 53. Consequently, three-phase alternating currents are generated and each of the swinging electric motor 25 and the assistant power generation motor 23 is driven by the commanded torque.

When a failure, an abnormality or a warning state has occurred in the electric system (the power control unit 55, the swinging electric motor 25, the capacitor 24, etc.) or when the electric amount of the capacitor 24 has gone out of the prescribed range, the abnormality monitoring/abnormality processing control block 81 or the energy management control block 82 switches the control switching block 85 to make it select the hydraulic solo swinging control block 84, by which the swing mode is switched from the hydraulic/electric combined swing mode to the hydraulic solo swing mode. Basically, the swinging hydraulic system has been properly matched with the swinging electric motor 25 so as to operate in coordination with the swinging electric motor 25. Thus, the hydraulic solo swinging control block 84 executes the control so that the swinging operability is not impaired even without the torque of the swinging electric motor 25, by making a correction of increasing the drive torque of the swinging hydraulic motor 27 and a correction of increasing the braking torque of the swinging hydraulic motor 27 by outputting a swinging drive property correction command EE and a swinging pilot pressure correction command EF to the electric-hydraulic conversion units 75c and 75d, respectively.

Figure 4:
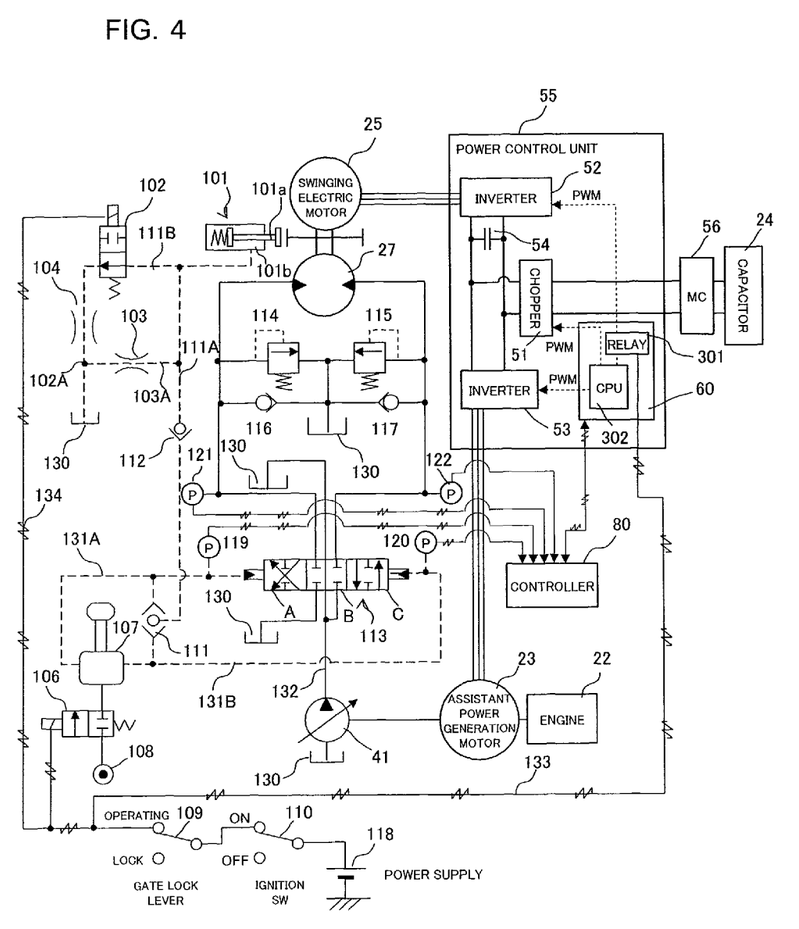
FIG. 4 is a schematic diagram showing the system configuration of a swinging/braking hydraulic system in the first embodiment of the hybrid construction machine in accordance with the present invention.

Next, the details of the swinging/braking hydraulic system will be explained referring to FIG. 4. FIG. 4 is a schematic diagram showing the system configuration of the swinging/braking hydraulic system in the first embodiment of the hybrid construction machine in accordance with the present invention. In FIG. 4, reference characters identical with those in FIGS. 1-3 represent the same components as in the figures, and thus detailed explanation thereof is omitted for brevity. The control valve 42 shown in FIG. 3 has a valve component called "spool" for each actuator. In response to a command (hydraulic pilot signal) from the swing control lever device 107 or 73, a corresponding spool shifts so as to change an opening area, by which the flow rate of the hydraulic fluid passing through each hydraulic line changes. The swinging/braking hydraulic system shown in FIG. 4 includes only a swinging spool (spool for the swinging).

In FIG. 4, the swinging/braking hydraulic system includes a swing brake 101 (implemented by a single acting cylinder with spring), a swing brake solenoid valve 102, the hydraulic pump 41, the swinging hydraulic motor 27, a swing operation solenoid valve 106, the swing control lever device 107, the swinging spool 113, variable overload relief valves 114 and 115 for the swinging, check valves 116 and 117 for the swinging, and a tank 130.

The hydraulic pump 41 is a variable displacement pump having an unshown regulator. By the operation of the regulator, the tilting angle of the hydraulic pump 41 is changed, the displacement volume of the hydraulic pump 41 is changed, and consequently, the discharge amount and the output torque of the hydraulic pump 41 are changed. When the reduced torque command EB is outputted by the hydraulic/electric combined swinging control block 83 (see FIG. 3) to the electric-hydraulic conversion unit 75a, the electric-hydraulic conversion unit 75a outputs corresponding control pressure to the regulator. According to the control pressure, the setting of the regulator is changed so as to reduce the maximum output torque of the hydraulic pump 41 by the torque outputted by the swinging electric motor 25.

The swinging spool 113 has three positions A, B and C. In response to the swing operation command (hydraulic pilot signal) from the swing control lever device 107, the swinging spool 113 is switched continuously from the neutral position B to the position A or C.

The swing control lever device 107 is connected to a pilot hydraulic pressure source 108 via the swing operation solenoid valve 106 (explained later). The swing control lever device 107 includes a pressure-reducing valve which reduces the pressure supplied from the pilot hydraulic pressure source 108 by an amount corresponding to the operation amount of the lever. The swing control lever device 107 supplies pressure corresponding to the lever operation amount (hydraulic pilot signal) to a left pressure chamber or a right pressure chamber of the swinging spool 113 via a line 131A or 131B.

The lines 131A and 131B are equipped with pressure sensors 119 and 120, respectively, for detecting the pressure inside the line. An intermediate part of the line 131A is connected to one input end of a shuttle valve 111, while an intermediate part of the line 131B is connected to the other input end of the shuttle valve 111. The shuttle valve 111 is provided as a hydraulic circuit for the swing brake 101 (explained later).

When the swinging spool 113 is at the neutral position B, the hydraulic fluid discharged from the hydraulic pump 41 returns to the tank 130 via a bleed-off throttle.

When the swinging spool 113 receiving the pressure corresponding to the lever operation amount (hydraulic pilot signal) is switched to the position A, the hydraulic fluid from the hydraulic pump 41 is sent to the left side of the swinging hydraulic motor 27 via a meter-in throttle at the position A. The hydraulic fluid returning from the swinging hydraulic motor 27 returns to the tank 130 via a meter-out throttle at the position A. Consequently, the swinging hydraulic motor 27 rotates in a direction.

Conversely, when the swinging spool 113 receiving the pressure corresponding to the lever operation amount (hydraulic pilot signal) is switched to the position C, the hydraulic fluid from the hydraulic pump 41 is sent to the right side of the swinging hydraulic motor 27 via a meter-in throttle at the position C. The hydraulic fluid returning from the swinging hydraulic motor 27 returns to the tank 130 via a meter-out throttle at the position C. Consequently, the swinging hydraulic motor 27 rotates in a direction opposite to the case of the position A.

Incidentally, a pressure sensor 121 for detecting the pressure of the hydraulic fluid sent from the hydraulic pump 41 to the left side of the swinging hydraulic motor 27 is arranged in a line connecting the swinging spool 113 to the left side of the swinging hydraulic motor 27. Similarly, a pressure sensor 122 for detecting the pressure of the hydraulic fluid sent from the hydraulic pump 41 to the right side of the swinging hydraulic motor 27 is arranged in a line connecting the swinging spool 113 to the right side of the swinging hydraulic motor 27.

When the swinging spool 113 is situated at an intermediate position between the position B and the position A, the hydraulic fluid from the hydraulic pump 41 is distributed to the bleed-off throttle and the meter-in throttle. In this case, pressure corresponding to the opening area of the bleed-off throttle develops on the inlet side of the meter-in throttle. By the pressure, the hydraulic fluid is supplied to the swinging hydraulic motor 27 and operating torque corresponding to the pressure (opening area of the bleed-off throttle) is applied to the swinging hydraulic motor 27. The hydraulic fluid discharged from the swinging hydraulic motor 27 receives resistance corresponding to the opening area of the meter-out throttle at that time and back pressure develops, by which braking torque corresponding to the opening area of the meter-out throttle is generated. The same goes for cases where the swinging spool 113 is situated at an intermediate position between the position B and the position C.

When the control lever of the swing control lever device 107 is returned to its neutral position and the swinging spool 113 is returned to the neutral position B, the swinging hydraulic motor 27 tends to keep on rotating due to the inertia of the swing structure 20 (inertial body). In this case, when the pressure of the hydraulic fluid discharged from the swinging hydraulic motor 27 (back pressure) is about to exceed a preset pressure of the variable overload relief valve 114 or 115 for the swinging, the overload relief valve 114 or 115 operates to drain part of the hydraulic fluid into the tank 130, by which the increase in the back pressure is restricted. Consequently, braking torque corresponding to the preset pressure of the overload relief valve 114 or 115 is generated.

Incidentally, the check valves 116 and 117, for preventing backward flow of the hydraulic fluid (discharged from the swinging hydraulic motor 27) to other systems during the operation of the overload relief valve 114 or 115, are arranged in parallel with the overload relief valves 114 and 115 so that each check valve 116, 117 can open only in one direction for letting through the hydraulic fluid from the tank 130 toward the swinging hydraulic motor 27.

The swing operation solenoid valve 106 is an electromagnetic control valve (changeover valve) of the 2-port 2-position type. The swing operation solenoid valve 106 selectively controls the connection/blockage between the pilot hydraulic pressure source 108 and the swing control lever device 107. When not energized, the swing operation solenoid valve 106 is placed by a spring member at a position for blocking up the line between the pilot hydraulic pressure source 108 and the swing control lever device 107. The swing operation solenoid valve 106 has an electromagnetic driving unit arranged on one side, to which an output cable of control means (explained later) is connected.

Next, the hydraulic circuit for the swing brake 101 of the braking hydraulic system for stopping the swing structure 20 will be explained in detail.

The swing brake 101 is an actuator as a type of a single acting cylinder with spring. The swing brake 101 includes a piston rod 101a which is pushed toward a rod chamber by an internal elastic body (e.g., spring member) arranged in a bottom chamber, an oil chamber 101b which is formed on the rod chamber's side of the piston cylinder and into which pilot hydraulic fluid flows, and a member (e.g., braking member) which is provided at the tip of the piston rod 101a and increases its pressing force (for impeding the rotation of the swing structure 20) depending on the amount of driving of the piston rod 101a.

The hydraulic circuit for the swing brake 101 supplies the pilot hydraulic fluid (supplied substantially from the pilot hydraulic pressure source 108) to the oil chamber 101b of the swing brake 101 via a pilot line, the shuttle valve 111 and the swing brake solenoid valve 102 (explained later), by which the pressing force of the aforementioned braking member is controlled and the rotation of the swing structure 20 is stopped.

To the output end of the shuttle valve 111 outputting pressure corresponding to the lever operation amount of the aforementioned swing control lever device 107, an end of a pilot line 111A (equipped with a check valve 112) is connected. The other end of the pilot line 111A is connected to the oil chamber 101b of the swing brake 101.

An end of another pilot line 111B is also connected to the oil chamber 101b of the swing brake 101. The swing brake solenoid valve 102, which switches the connection/blockage between the pilot line 111B and a waste oil line 102A connecting with the tank 130, is connected to the other end of the pilot line 111B. The swing brake solenoid valve 102 is an electromagnetic control valve (changeover valve) of the 2-port 2-position type. The swing brake solenoid valve 102 selectively controls the connection/blockage between the oil chamber 101b of the swing brake 101 and the tank 130. When not energized, the swing brake solenoid valve 102 is placed by a spring member at a position for setting the oil chamber 101b of the swing brake 101 and the tank 130 in a connected state. The swing brake solenoid valve 102 has an electromagnetic driving unit arranged on one side, to which an output cable of the control means (explained later) is connected.

The waste oil line 102A has a weak throttle 104 arranged inside. The pilot line 111A is connected with a part of the waste oil line 102A between the weak throttle 104 and the tank 130 via a line 103A having a throttle 103 arranged inside.

Next, a first electric circuit which stops the PWM output of the inverter controller 60 (explained later) at the time of an emergency stop and a second electric circuit which operates the swing brake solenoid valve 102 and the swing operation solenoid valve 106 at the time of the emergency stop will be explained below.

As shown in FIG. 4, the electric circuit related to the emergency stop is made up of the first electric circuit including a relay or switch 301 which blocks the PWM signal (outputted from the inverter controller 60 to the inverter 52 for the swinging electric motor) in response to either the operator's selection (an immobilization selection inputted through a switch of the gate lock lever device 109 or an OFF selection inputted through the ignition switch 110) and the second electric circuit including the swing brake solenoid valve 102 which activates the swing brake 101 in response to either the operator's selection (the immobilization selection inputted through the switch of the gate lock lever device 109 or the OFF selection inputted through the ignition switch 110).

The first electric circuit has an output cable 133 connected to the relay or switch 301 of the inverter controller 60 of the power control unit 55. The second electric circuit has an output cable 134 connected to the electromagnetic driving units of the swing brake solenoid valve 102 and the swing operation solenoid valve 106.

The first and second electric circuits are electrically connected to a power supply 118 via the gate lock lever device 109 and the ignition switch 110 which are connected in series. Therefore, the electric power is supplied to connecting parts of the output cables 133 and 134 only when the gate lock lever device 109 is set at its operating position and the ignition switch 110 is set at its ON position.

As shown in FIG. 4, the inverter controller 60 includes a CPU 302, as a computation unit which generates the PWM signal according to the commands from the controller 80, and the relay or switch 301 which is driven by a signal inputted from the aforementioned output cable 133. When the relay or switch 301 is ON, the PWM signal generated by the CPU 302 is outputted to the inverter 52. When the relay or switch 301 is turned OFF, the PWM signal to the inverter 52 is stopped. Thus, in this embodiment, the PWM signal output from the CPU 302 to the inverter 52 is stopped by an electric signal, not via the CPU 302 (that is, not via software installed in the CPU 302).

Next, the operation of this embodiment in accordance with the present invention will be described with reference to FIG. 4.

Referring to FIG. 4, when the ignition switch 110 is set at the ON position and the gate lock lever device 109 is set at the operating position, the electromagnetic driving unit of the swing operation solenoid valve 106 is energized and switched to the connecting position. Consequently, the pilot hydraulic fluid from the pilot hydraulic pressure source 108 is supplied to the swing control lever device 107. Further, the electromagnetic driving unit of the swing brake solenoid valve 102 is energized and switched to the blocking position. Consequently, the connection (communication) between the oil chamber 101b of the swing brake 101 and the tank 130 is blocked and the hydraulic fluid from the shuttle valve 111 flows into the oil chamber 101b of the swing brake 101.

When the swing control lever device 107 is operated, the hydraulic fluid is supplied to the left pressure chamber or the right pressure chamber of the swinging spool 113 via the pilot hydraulic circuit 131A or 131B, drives the spool, and connects (opens) a main hydraulic circuit 132 between the hydraulic pump 41 and the swinging hydraulic motor 27.

Consequently, the swinging hydraulic motor 27 rotates and thereby drives the swing structure 20 (FIG. 1).

At the same time, the hydraulic fluid is sent to the oil chamber 101b of the swing brake 101 via the shuttle valve 111 and the check valve 112, by which the piston rod 101a is retracted, the pressing force of the braking member against the swing structure 20 is canceled, and the brake is released.

When the swing control lever device 107 is returned to its neutral position, the swinging spool 113 returns to the neutral position B and closes the main hydraulic circuit 132 between the hydraulic pump 41 and the swinging hydraulic motor 27, by which the swinging hydraulic motor 27 is stopped. At the same time, the hydraulic fluid stops being supplied to the swing brake 101 via the shuttle valve 111 and the check valve 112 and drains into the tank 130 via the throttle 103. Thus, the swing brake 101 works after a prescribed time period corresponding to the degree of throttling of the throttle 103 and stops and holds the swing structure 20.

As for the swinging electric motor 25, when the swing control lever device 107 is operated and pressure is caused in the hydraulic pilot circuit 131A or 131B, the pressure signal is detected by the pressure sensor 119 or 120, converted into an electric signal, and inputted to the controller 80. The controller 80 recognizes the electric signal as the lever operation amount and calculates the output torque of the swinging hydraulic motor 27 based on the pressure in the main hydraulic circuit detected at the same time by the pressure sensor 121 or 122. Subsequently, the controller 80 calculates the command torque for the swinging electric motor 25 from the calculated output torque of the swinging hydraulic motor 27 and the lever operation amount, and outputs a command signal to the inverter controller 60 of the power control unit 55. The inverter controller 60 outputs a PWM signal to the inverter 52 according to the received command signal and thereby opens and closes the unshown switching elements in the inverter 52. Consequently, a three-phase alternating current is generated and the swinging electric motor 25 is driven by the commanded torque.

During the driving of the swing structure 20 carried out as above, an abnormality can occur in the movement of the swing structure 20 due to an abnormality in an electric component of the power control unit 55 or an abnormality in the inverter controller 60 or the controller 80, for example. When the operator feels such an abnormal movement of the swing structure 20 and recognizes danger, the operator may first return the swing control lever device 107 to the neutral position and wait and see how things go.

If the danger can not be eliminated by returning the swing control lever device 107 to the neutral position, the operator may switch the gate lock lever device 109 to the lock position or return the ignition switch 110 to the OFF position to stop the engine 22 (emergency stop means). In this embodiment, when any one of these emergency stop means is taken, the signal energizing the relay or switch 301 of the inverter controller 60 via the output cable 133 is disconnected and the PWM signal output from the CPU 302 of the inverter controller 60 to the inverter 52 for the swinging electric motor 25 is stopped, by which the swinging electric motor 25 can be turned to the free running state.

Meanwhile, the energization of the electromagnetic driving unit of the swing operation solenoid valve 106 is canceled and the swing operation solenoid valve 106 is switched to the blocking position by the restoring force of the spring. Consequently, the supply of the pilot hydraulic fluid from the pilot hydraulic pressure source 108 is stopped. Further, the energization of the electromagnetic driving unit of the swing brake solenoid valve 102 is also canceled and the swing brake solenoid valve 102 is switched to the connecting position by the restoring force of the spring. Consequently, the oil chamber 101b of the swing brake 101 is connected with the tank 130, the hydraulic fluid inside the oil chamber 101b flows out to the tank 130 via the weak throttle 104 of the waste oil line 102A, and the swing brake 101 is activated. Incidentally, the degree of throttling of the weak throttle 104 has been set properly so that the swing brake 101 can work in a short time not affecting the emergency-stop braking. To sum up, the braking operation in the normal stop is started a certain time period (determined by the throttle 103) after detecting the neutral position of the swing control lever device 107, whereas the braking operation in the emergency stop is started in a shorter time period (determined by the weak throttle 104), compared to the certain time period after the detection by the normal stop means, after detecting a signal from emergency stop detecting means.

According to the above-described first embodiment of the hybrid construction machine in accordance with the present invention, when the swing structure 20 moves differently from the operator's will for some reason in a hybrid construction machine employing an electric motor for the driving of the swing structure 20, the operator's stopping operation for ordinary construction machines (returning the ignition switch 110 of the engine 22 to the OFF position, switching the gate lock lever device 109 to the lock position, etc.) securely turns the swinging electric motor 25 to the free running state and activates the swing brake 101 with appropriate timing, by which the swing structure 20 can be stopped immediately. Consequently, the safety of hybrid construction machines and operators can be improved and the operating ratio of hybrid construction machines can be increased.

Further, according to the above-described first embodiment of the hybrid construction machine in accordance with the present invention, by switching the gate lock lever device 109 to the lock position or returning the ignition switch 110 to the OFF position when the swing structure 20 moves differently from the operator's will for some reason, the swinging electric motor 25 can securely be turned to the free running state by the electric circuit-based mechanism and the swing brake solenoid valve 102 can be opened to release the hydraulic fluid, by which the swing brake 101 can be activated immediately and the swing structure 20 can be emergency-stopped.

Figure 5:
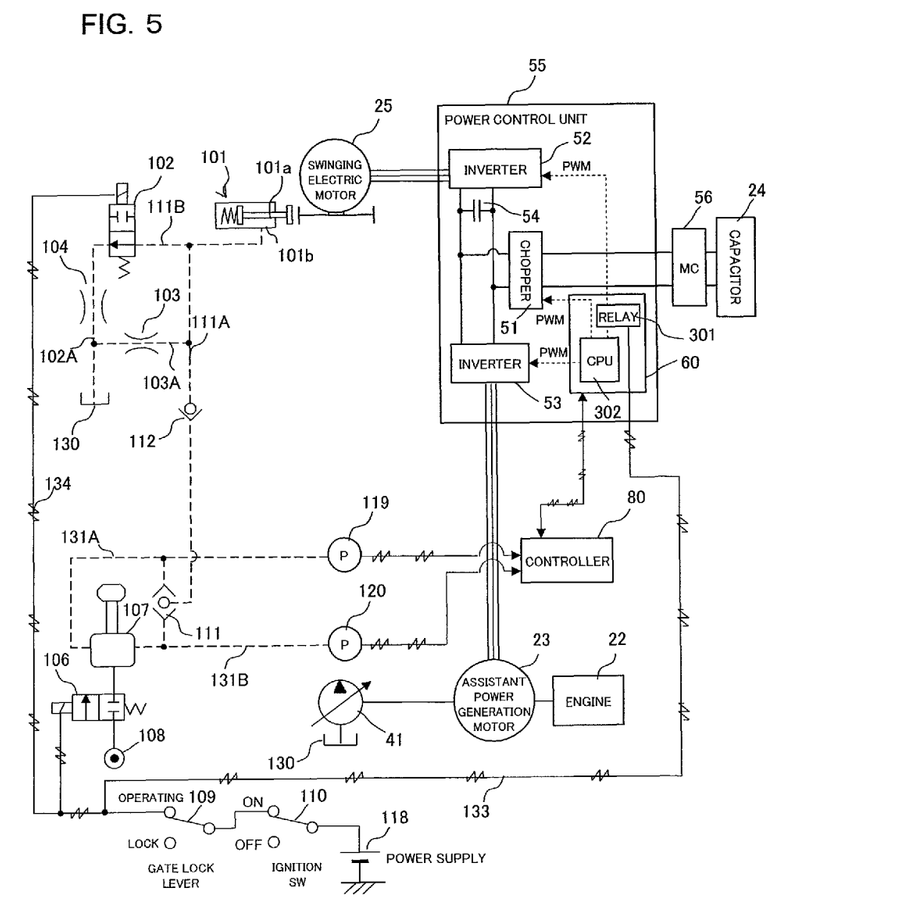
FIG. 5 is a schematic diagram showing the system configuration of the swinging/braking hydraulic system in a second embodiment of the hybrid construction machine in accordance with the present invention.

Next, a hydraulic shovel as a second embodiment of the hybrid construction machine in accordance with the present invention will be described with reference to FIG. 5. FIG. 5 is a schematic diagram showing the system configuration of the swinging/braking hydraulic system in the second embodiment of the hybrid construction machine in accordance with the present invention. In FIG. 5, reference characters identical with those in FIGS. 1-4 represent components identical or equivalent to those in the figures, and thus repeated explanation thereof is omitted for brevity.

In the first embodiment shown in FIG. 4, the swinging electric motor 25 and the swinging hydraulic motor 27 are provided for driving the swing structure 20. In this embodiment, the swing structure 20 is driven by the swinging electric motor 25 alone differently from the first embodiment. Also in this embodiment, by switching the gate lock lever device 109 to the lock position or returning the ignition switch 110 to the OFF position, the swinging electric motor 25 can securely be turned to the free running state by the electric circuit-based mechanism and the swing brake solenoid valve 102 can be opened to release the hydraulic fluid, by which the swing brake 101 can be activated immediately and the swing structure 20 can be emergency-stopped similarly to the first embodiment.

According to the second embodiment of the hybrid construction machine in accordance the present invention, effects equivalent to those of the above-described first embodiment can be achieved.

In the present invention, the PWM output from the CPU 302 to the inverter 52 for the swinging electric motor is stopped via no software installed in the CPU 302 by directly inputting the electric signal of the gate lock lever device 109 or the ignition switch 110 to the inverter controller 60 and having the inverter controller 60 drive the relay or switch 301 with the signal.

However, a function of stopping a PWM output not via a CPU by using an electric signal is a hardware function commonly installed in recent microcontrollers for motor control. Therefore, the present invention may also be implemented by forming the inverter controller 60 by use of such a microcontroller, without installing the relay or switch 301 in the inverter controller 60.

Incidentally, while the above embodiments of the present invention have been described by taking examples in which the switch unit of the gate lock lever device 109 and the ignition switch 110 are connected in series in the electric circuit as the emergency stop means, the configuration of the electric circuit is not restricted to these examples. For example, the electric circuit as the emergency stop means may also be formed by employing only one selected from the switch unit of the gate lock lever device 109 and the ignition switch 110.

DESCRIPTION OF REFERENCE CHARACTERS 10 track structure
11 crawler
12 crawler frame
13 right traveling hydraulic motor
14 left traveling hydraulic motor
20 swing structure
21 swing frame
22 engine
23 assistant power generation motor
24 capacitor
25 swinging electric motor
26 deceleration mechanism
27 swinging hydraulic motor
30 shovel mechanism
31 boom
33 arm
35 bucket
41 hydraulic pump
42 control valve
51 chopper
52 inverter for swinging electric motor
53 inverter for assistant power generation motor
54 smoothing capacitor
55 power control unit
56 main contactor
57 main relay
58 inrush current prevention circuit
60 inverter controller
80 controller
81 abnormality monitoring/abnormality processing control block
82 energy management control block
83 hydraulic/electric combined swinging control block
84 hydraulic solo swinging control block
85 control switching block
101 swing brake
102 swing brake solenoid valve
103 throttle
104 weak throttle
106 swing operation solenoid valve
107 swing control lever device
108 pilot hydraulic pressure source
109 gate lock lever device
110 ignition switch

The invention claimed is:

1. A hybrid construction machine having a prime mover, an ignition switch for starting and stopping the prime mover, a hydraulic pump which is driven by the prime mover, a swing structure, an electric motor for driving the swing structure, an electricity storage device which is connected to the electric motor, an inverter for driving the electric motor, hydraulic actuators which are driven by the hydraulic pump, a swing brake which is driven by hydraulic pressure and stops the rotation of the swing structure, a gate lock lever switch which is used for selecting whether to mobilize or immobilize the hydraulic actuators, and a swing control lever device which is used for commanding the driving of the swing structure, wherein the hybrid construction machine comprises:
   an inverter controller which outputs a PWM signal to the inverter and thereby controls the revolution speed of the electric motor;
   a first electric circuit including blocking means which blocks the PWM signal outputted from the inverter controller to the inverter in response to either an immobilization selection inputted through the gate lock lever switch or an OFF selection inputted through the ignition switch; and
   a second electric circuit including a swing brake solenoid valve which activates the swing brake in response to either the immobilization selection inputted through the gate lock lever switch or the OFF selection inputted through the ignition switch.

2. The hybrid construction machine according to claim 1, further comprising:
   a hydraulic motor for driving the swing structure; and
   a control device which drives the swing structure with total torque of the electric motor and the hydraulic motor by driving both the electric motor and the hydraulic motor when the swing control lever device is operated.

3. The hybrid construction machine according to claim 2, wherein the swing brake driven by hydraulic pressure includes:
   normal stop means which starts braking operation a certain time period after detecting a neutral position of the swing control lever device; and
   emergency stop means which starts braking operation in a shorter time period, compared to the certain time period after the detection by the normal stop means, in response to a signal from emergency stop detecting means.

4. The hybrid construction machine according to claim 1, wherein the swing brake-driven by hydraulic pressure includes:
   normal stop means which starts braking operation a certain time period after detecting a neutral position of the swing control lever device; and
   emergency stop means which starts braking operation in a shorter time period, compared to the certain time period after the detection by the normal stop means, in response to a signal from emergency stop detecting means.

* * * * *